Figure 1:
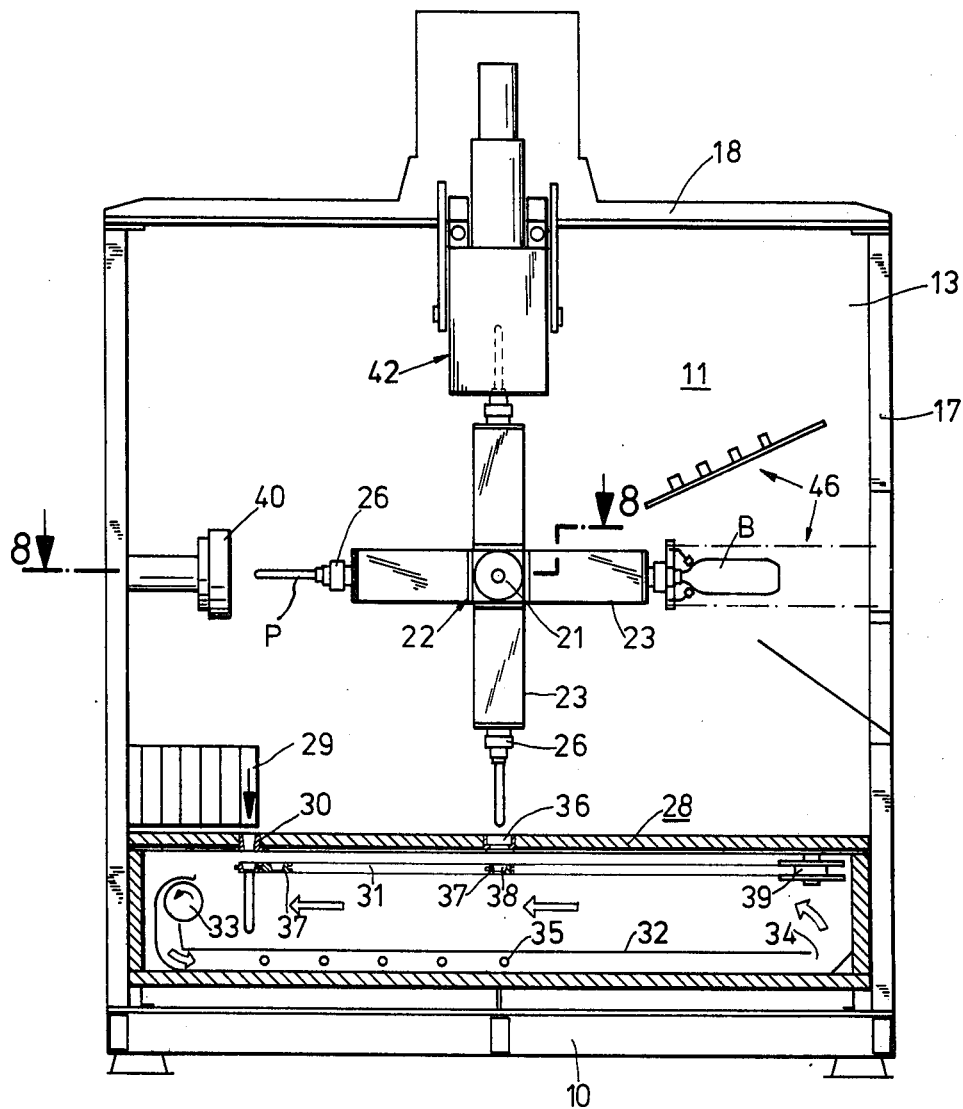

United States Patent [19]

Appel et al.

[11] 4,046,498

[45] Sept. 6, 1977

[54] APPARATUS FOR BLOW-MOLDING HOLLOW ARTICLES, IN PARTICULAR BOTTLES

[75] Inventors: Adolf Appel, Egestorf-Nordheide; Wolfgang Reymann, Hamburg, both of Germany

[73] Assignee: Gildemeister Corpoplast GmbH, Hamburg, Germany

[21] Appl. No.: 728,809

[22] Filed: Oct. 1, 1976

[30] Foreign Application Priority Data

Oct. 8, 1975 Germany .............................. 2545131

[51] Int. Cl.² .............................................. B29C 17/07
[52] U.S. Cl. ..................................... 425/526; 425/534
[58] Field of Search ........... 425/DIG. 211, DIG. 216, 425/387 B, 342, DIG. 203, DIG. 208, DIG. 213; 264/97

[56] References Cited

U.S. PATENT DOCUMENTS

| 2,819,490 | 1/1958 | Froot | 425/DIG. 211 |
| 3,415,915 | 12/1968 | Lecluyse et al. | 425/DIG. 211 |
| 3,850,562 | 11/1974 | Takeuchi et al. | 425/DIG. 216 |

Primary Examiner—Richard B. Lazarus
Attorney, Agent, or Firm—Cullen, Settle, Sloman & Cantor

[57] ABSTRACT

A machine for blow molding articles, particularly bottles wherein a central, horizontal shaft carries a plurality of radial arms positionable at an equivalent number of work stations arranged in a common vertical plane. The work stations are grouped around the central shaft and are at varying distances from the shaft, and the arms are extensible to reach the stations furthest spaced from the shaft. Fixed actuating means are located adjacent the remote stations and the extensible arms are coupled to the actuating means located at these remote stations. In this way, the extensible actuating means is provided only where needed, the mass and complexity of the rotary arms is reduced and a simple, efficient structure is obtained. The method of the present invention includes the rotation of the shaft in stepwise fashion to align the arms in succession with the work stations and coupling the arm to the fixed actuating means for extension and retraction of the arms at the remote work stations.

7 Claims, 13 Drawing Figures

APPARATUS FOR BLOW-MOLDING HOLLOW ARTICLES, IN PARTICULAR BOTTLES

The present invention refers to an apparatus for economically producing hollow articles, in particular beveridge bottles of high strength, wherein parisons are heated to blow temperature and then blown to finished articles. The hourly output rate of the apparatus is in the order of up to 500 bottles. The invention refers therefore to a medium sized machine and the manufacturing costs are kept low.

It is an object of the present invention to provide for a less complex arrangement, in particular with respect to the transport means to convey to parisons between the input and the bottle output. A further object is to provide for simple drive means to provide for the various motions of the parisons. A still further object is an easy control of the machine.

Another object is to enable the user to install the machine in a short period of time and a simple and reliable operation.

Further it should be easily possible to replace certain components of the machine if it is desired to blow different bottle shapes without the need of shutting down the complete machine.

The present invention comprises a step wise rotatably driven carrier wheel including a plurality of radially displacable pusher members which are provided with adapter means to grip a parison, and further comprises a plurality of working stations which are stationarily mounted with respect to the periphery of the carrier wheel. The working stations include a preheating station to heat a large number of parisons to a minimum temperature level, followed by a heating station to heat the parisons individually to the blow temperature required, and a blow-mold station and finally an output station for the finished containers.

The carrier wheel transfers the parisons step by step from the preheating station through the heating station and blow-mold station to the output station. The carrier wheel carries four arms each accomodating a radially movable pusher member. An adapter means to grip a parison is mounted at the forward end of each pusher member. The adapter means is rotatably supported with respect to the pusher member so that the parison may be rotated while being heated in the heating station. The pusher member is driven to perform an extending and retracting motion required to take a parison out of the preheating station and to subject the parison to the subsequent heat source. The drive means required for these motions are stationarily arranged and fixed to the machine housing. The drive means may be coupled to the pusher member in response to a predetermined rotary position of the carrier wheel. The stationary drive means cause the linear motion of the adapter means as well as the rotation thereof. From this it should be understood that the carrier wheel is a particularly simple structure incorporating a small number of additional components such as conduits for the blow air and a pneumatic cylinder for an expanding mandrel which expands the parison to a predetermined length when the parison is enclosed in the blow-mold station.

The stationary drive means result in a further advantage that each drive means may be easily selected to particularly fit the drive needs of the parisons in the preheating station and the heating station. To take a parison out of the preheating station a constant linear motion is required, while the parison is not rotated. In the heating station, however, the parison is desired to be heated gradually to different temperature levels along tis axis. This is obtained by a speed control of the drive means which is further required to rotate the parison. The drive means actuating the pusher member adjacent the preheating station and the heating station are substantially of the same structure.

The invention provides screw-type spindle drive means, wherein the nut screwed on the spindle carries a guiding groove into which a drive finger of the pushing member is positioned if the carrier wheel is rotated into the predetermined rotary position. Subsequently the spindle is rotated and thus moves the nut together with the pusher member and the adapter in a linear motion.

The drive mechanism just described requires a suitable structure of the preheating station and the heating station. In the preheating station the parisons are subjected to a hot air stream of constant temperature while being passed though the station by means of a conveyor which is driven in synchronism with the drive means actuating the carrier wheel. The speed setting of the conveyor is selected such that a free adapter comes into alignment with a parison still being in the preheating station below a discharge opening each time the carrier wheel comes to a stop. The conveyor comprises a plurality of linked members each having a central opening supporting the parison vertically depending therefrom. Inserting the parisons into the central openings from above may take place by releasing the parisons from a magazine e. g. In the extending motion of the adapter the neck-portion of the parison is gripped internally and from above, wherein the adapter includes a seal to seal the parison off with respect to the blow medium inflating the parison in the blow-mold station. In the retracting motion of the adapter the parison is withdrawn from the discharge opening out of the central opening of the link member in an upward direction. This provides for a particularly simple device.

The same applies to the heating station which comprises a plurality of radiators arranged in a ring-like configuration and a plurality of reflector shields which centre the radiation inwardly towards the centre axis of the radiators. The parison is extended and retracted along the centre axis of the radiators. In performing this motion the adapter is speed-controlled to heat subsequent axial portions of the parison to different temperature levels which are required for a desired wall thickness distribution obtained in the following blow-mold step. In the heating station the adapter is rotatably driven to obtain uniform heating of the parison around its periphery. This drive means allows for a high accuracy in the heating of the parison to the blow-mold temperature within a predetermined limited temperature range.

The parison is pivoted from the heating station towards the blow-mold station and enters this station between the blow mold sections which are in the opened position. No linear motion of the pusher is required. The drive mechanism of the blow mold sections must generate a very high closing pressure during the inflating process, while in the opened position the parison as well as the inflated finished article must freely pass between the blow mold sections. Further both blow-mold sections are displaced by a common drive means. The blow-mold station according to the invention comprises a rotatable driven shaft having a pair of diametrically opposed eccentric pins, wherein one pin is linked to the adjacent blow-mold section through a short lever, whereas the second eccentric pin is connected to the opposite blow-mold section through an actuate long lever. The shape of the lever is unique and allows the parisons to freely pass between the blow mold sections in the opened position. In the closed position of the blow-mold sections the eccentric pins and the links between the levers and the blow-mold sections all are positioned on a straight line so that in this position the forces created by the blow pressure acting on both blow-mold sections are balanced.

The blow-mold sections are further provided with a cooling device to accelerate the solidification of the bottles inflated. The cooling is particularly important to decrease the period of time during which the parison is in the blow-mold station and thus to reduce the cycle time of the machine. Connecting the cooling system to the blow-mold should be easily possible if it is desired to install different blow-mold sections.

According to the invention the blow-mold sections are provided each with semi-cylindrical recesses. Insert members having an inner surface corresponding to the bottle walls are mounted in those insert members. Preferably the end of each insert adjacent the neck portion of the bottle is mounted on the blow-mold section and may be easily pulled out and replaced by a different insert after removal of the mounting means. The cooling channels for passing a cooling medium therethrough are defined to be grooves within the semicylindrical recess of the blow-mold sections which grooves are open towards the insert members. The grooves are connected through suitable ports and passages to the cooling water conduits. Accordingly the outer peripheral wall of the insert members is cooled and replacing the insert members does not require a part assembly of the cooling system. A seal continuously extends in the surface of the semi-cylindrical recesser outside the open grooves within a small distance of the outer edges of the recesses which seal thus surrounds all grooves and prevents cooling water from passing between the insert members and the blow-mold section. The shaft of the carrier wheel is rotatably supported in a bearing means mounted on a vertical wall of the machine. The preheating station is located at the lower portion of the vertical wall, whereas the heating station is located in the nine o'clock position, the blow-mold section in the 12 o'clock position and the discharge station at the three o'clock position; all stations mounted to the front side of the wall. The rear side of the vertical wall serves to mount the drive motors, gear boxes, control means and fittings including power supply and cooling system. Accordingly the stations as well as the components on both sides of the vertical support wall are easily accessable for service, repair and observation.

Figure 2:
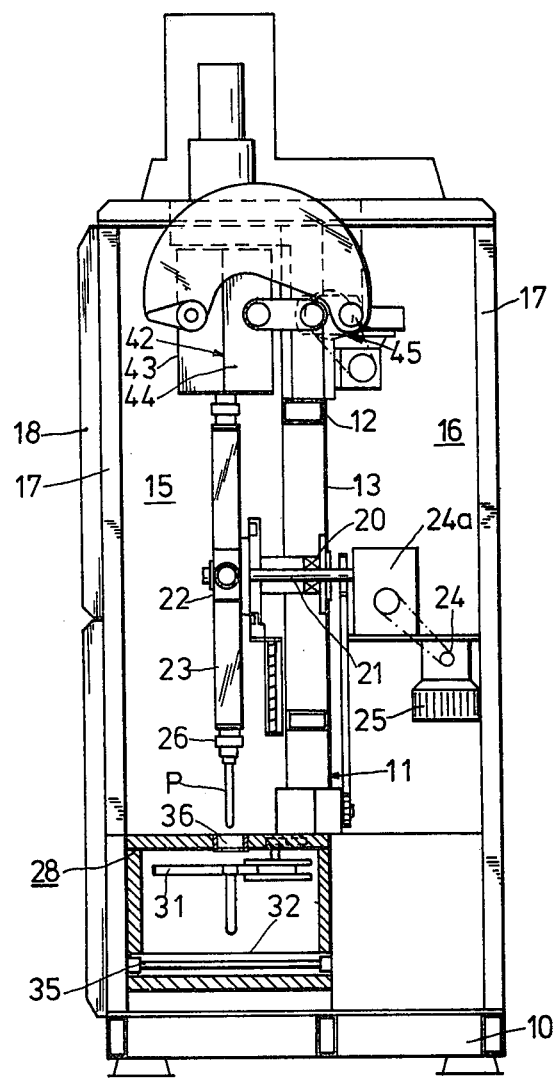
Figure 3:
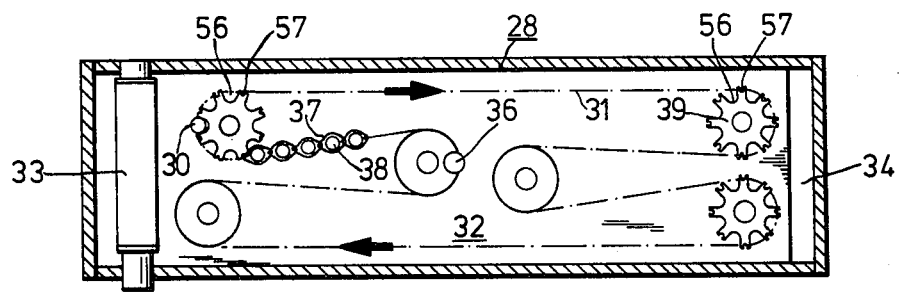
Figure 4:
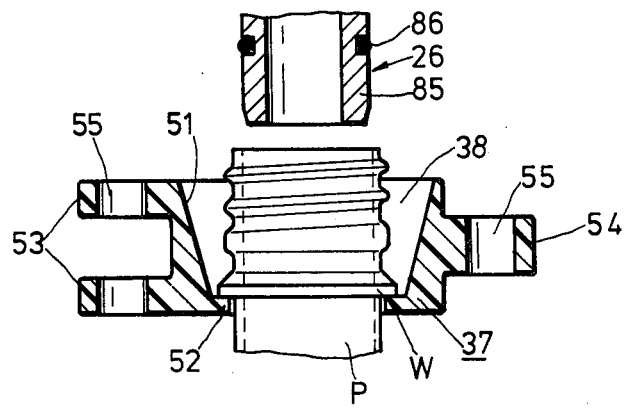
Figure 5:
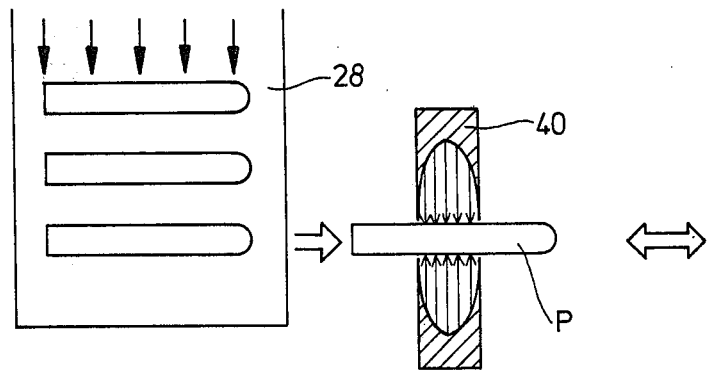
Figure 6:
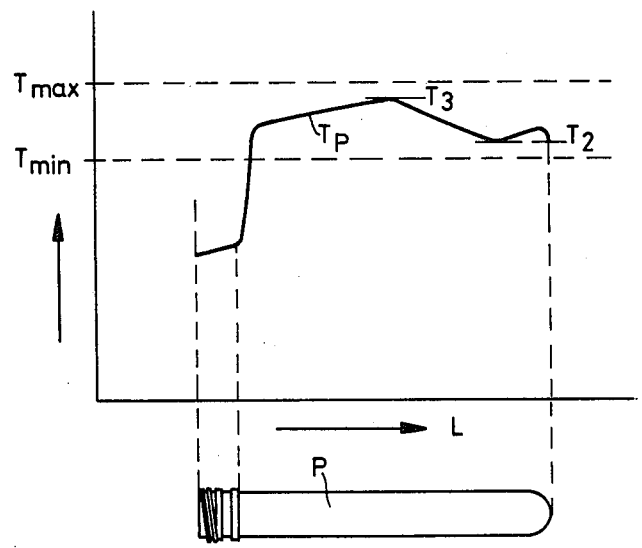
Figure 7:
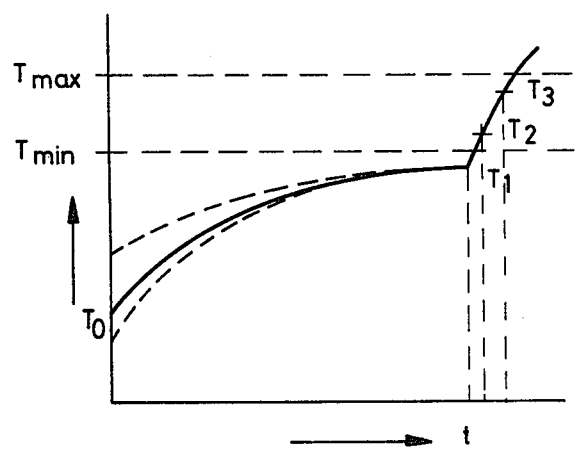
Figure 8:
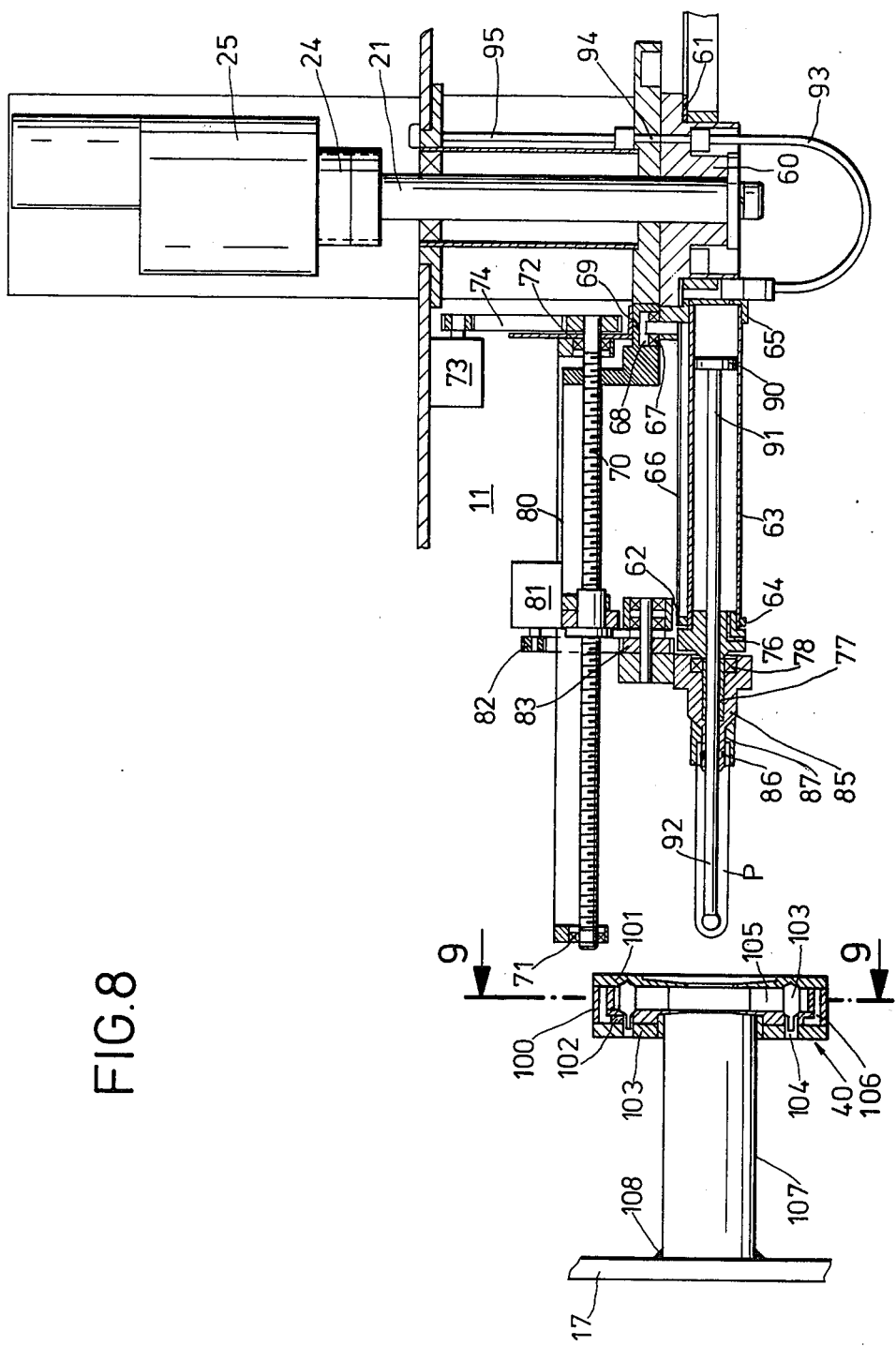
Figure 9:
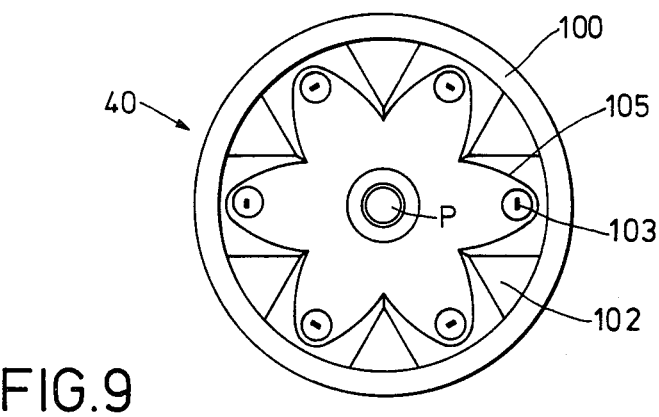
Figure 10:
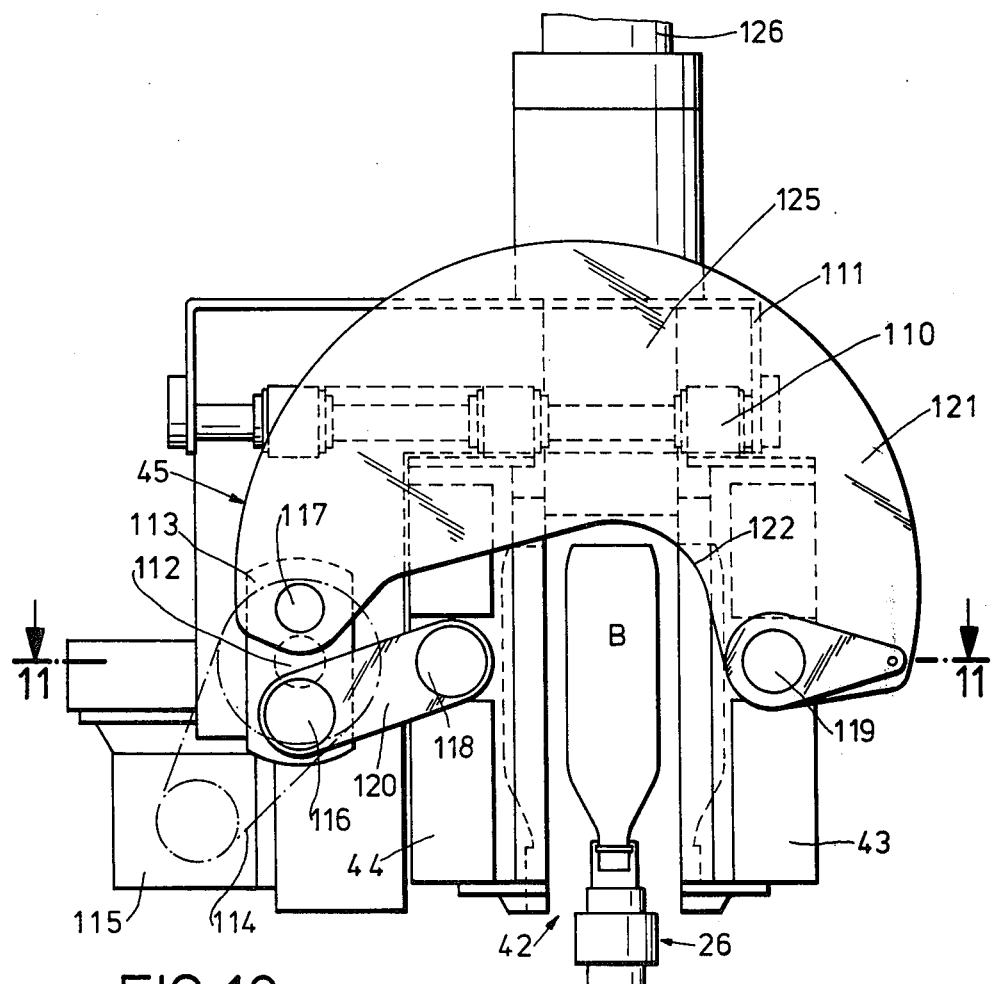
Figure 11:
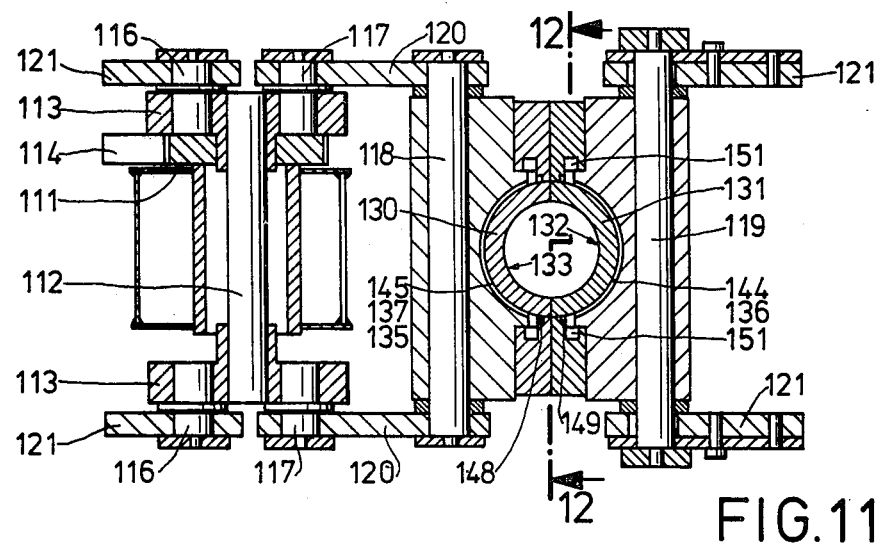
Figure 12:
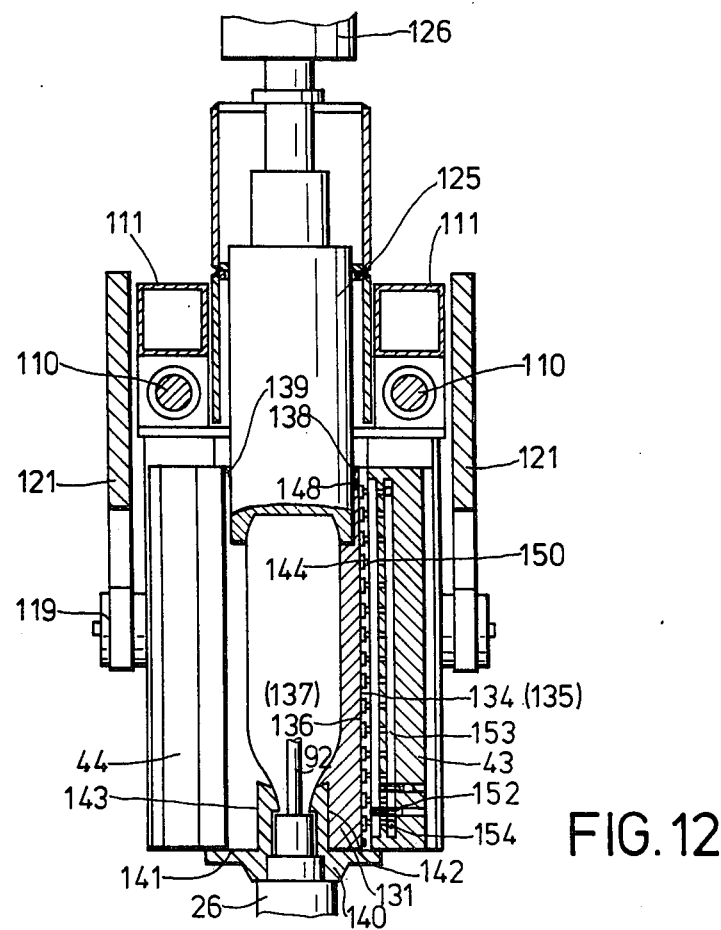
Figure 13:
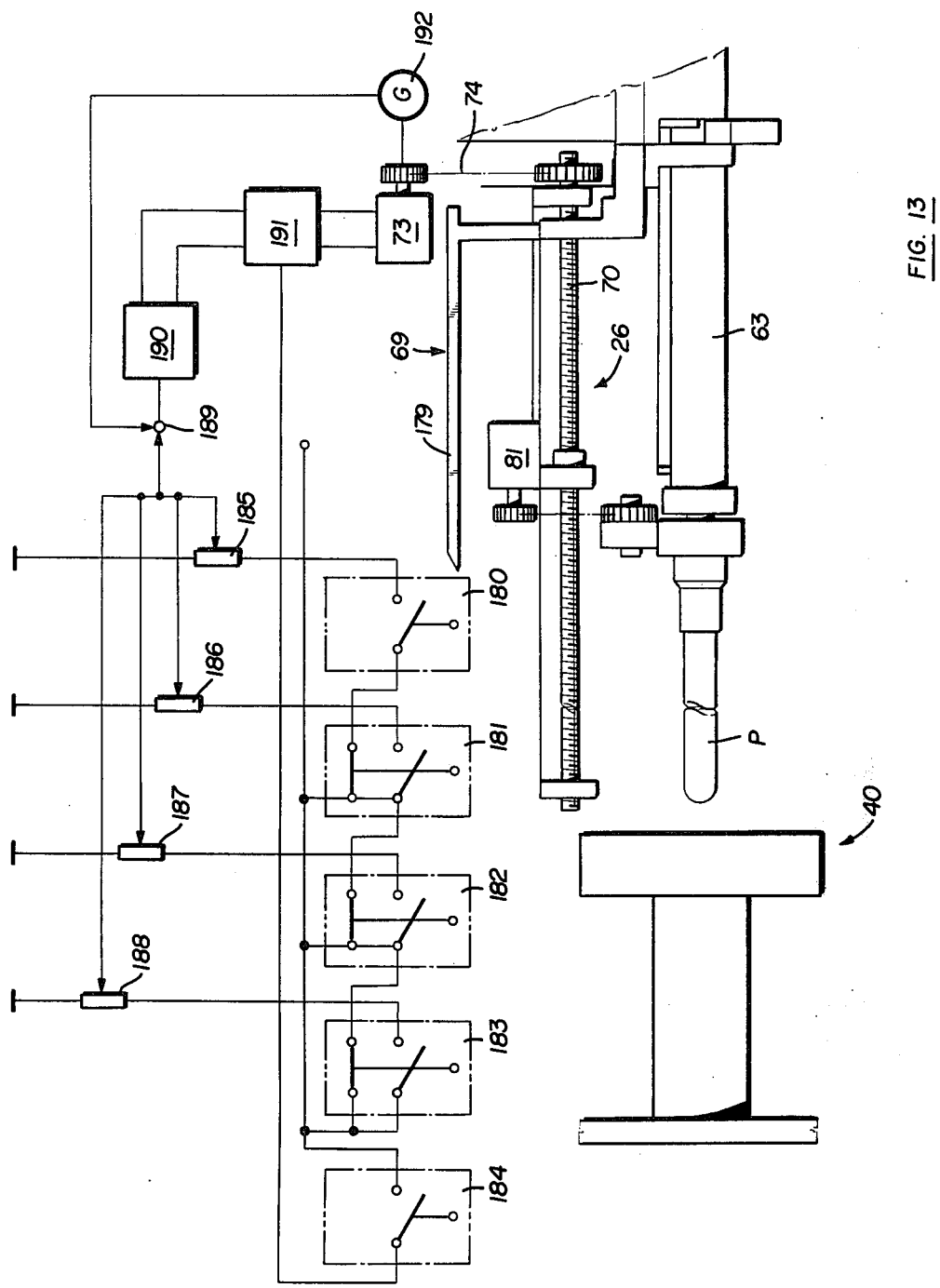

The invention is illustrated in the accompanying drawings which form a material part of this application and in which:

FIG. 1 is a front view of the machine,
FIG. 2 is a side view of the machine,
FIG. 3 is a top view of the preheating station,
FIG. 4 is an axial section through a link member of the conveyor chain,
FIG. 5 shows schematically the heating steps performed on the parison,
FIG. 6 is a plot of the temperature profile $T_p$ along the parison axis L,
FIG. 7 is a plot of the temperature T depending on heating time t, FIG. 8 is an enlarged section of the heating station, and one arm of the carrier wheel taken along lines 8—8 in FIG. 1,
FIG. 9 is a section through the heating station taken along lines 9—9 in FIG. 8,
FIG. 10 is a side view of the blow-mold section,
FIG. 11 is a section of the blow-mold station taken along lines 11—11 in FIG. 10, and
FIG. 12 is a section of the blow-mold section taken along lines 12—12 in FIG. 11.
FIG. 13 is a view similar to FIG. 8 and illustrating the drive mechanism at the heating station.

FIGS. 1 and 2 show schematically the blow-molding machine which has a frame comprising a base structure 10 and a wall 11 vertically secured to the base structure. The base structure and the wall are composed of rectangular closed profiles 12. Sheet-metal plates 13 including suitable apertures are secured to the profiles 12 of the wall 11 thus subdividing the casing into a space 15 located at the front side of the wall 11 to which the various stations are mounted through which the parisons pass, and a space 16 located at the rear side of the wall 11 to which a plurality of auxiliary means and control means is secured. These means, such as power supply, switches and control means, coolers etc., are not shown. The casing is further made up of frame members 17 which are connected to the base structure 10 and the wall 11 and which are covered on all sides by panels 18, as illustrated, for example, on the left side of the frame of FIG. 2.

As shown in FIG. 2, a horizontal shaft 21 extends through an opening of the wall 11. The shaft 21 is rotatably supported by means of bearings 20 and carries a carrier wheel 22 disposed ahead of the front side of the wall which wheel substantially consists of four equally spaced, radial arms 23. The carrier wheel 23 is driven step-by-step, each step being a clockwise rotation through 90°. As a drive means a gearbox 24 and an electric motor 25 are provided at the rear side of the wall 11. To achieve smooth starting and stopping operations, preferably a Geneva drive 24a is connected between the gear box 24 and the shaft 21.

Each arm 23 carries an adapter means or blow pin 26 for engaging a parison P. The adapter means 26 is mounted on the arm 23 so as to be movable in longitudinal direction thereof, i.e. radially with respect to the centre of the shaft. For details of the drive means and the arms attention is drawn to FIG. 8.

FIG. 6 shows a parison whose open neck is already provided with a finished thread and whose bottom portion is closed. The machine according to the present invention performs all the steps of heating and blow-molding parisons of this type.

A plurality of spaced, peripheral individual stations are stationarily located around the carrier wheel 23. As shown in FIGS. 1 thru 4, vertically below the carrier wheel 22 a preheating station 28 is arranged in which the parisons are heated throughout to a first temperature level by a hot-air stream. The parisons P from a magazine 29 enter the preheating station through a feed opening 30 and are moved through the preheating station on a conveyor chain 31. Below the horizontal separating wall 32 a number of heating elements 35 is disposed. The air to be heated is sucked in by a fan 33, passes over the heating elements 35 and enters the preheating space on the opposite side through a recess 34 for flow back to the fan 33. Through the discharge opening 36 of the preheating station 28, the adapter means 26 when located vertically thereabove receives a heated parison P.

Subsequently the carrier wheel 22 is rotated clockwise through 90°, and the parison arrives at a heating station 40. The heating station substantially comprises annularly disposed infrared radiators with reflectors which center the heat radiation on the central axis of the radiator arrangement. The adapter means 26 holding the parison P performs a linear motion during which the parison is moved into and retracted from the heating station along the central axis thereof. The parison is thus heated to the required blowing temperature level. Furthermore, by controlling the speed of this linear motion, a variation in the temperature level can be imparted to the parison in longitudinal direction thereof, which is desirable for controlling the wall thickness during the subsequent blow-molding step.

Thereupon the carrier wheel 23 is rotated through 90° again, whereby the parison is conveyed to the blow-molding station 42 secured to the wall 11 vertically above the shaft 21 of the carrier wheel 23. As illustrated in FIG. 2, the blow-molding station 42 comprises two mold sections 43, 44 which can be moved by a lever mechanism 45 between an open position and a closed position. In the open position, the distance between the mold sections 43 and 44 is dimensioned such that, during rotation of the carrier wheel 22, the parison can be moved past between the mold sections into the mold cavity, and during further clockwise rotation of the carrier wheel the finished container can emerge.

Upon a further rotation through 90°, the container B reaches the ejecting station 46 where the container is sensed for accuracy of dimensions and then ejected.

Thus, the machine operates cyclically, with the carrier wheel being indexed each time through 90° to convey the parisons to the individual stations. The indexing intervals are substantially dependent on the time required for the heating step in the heating station 40 or the blowing step in the blow-molding station 42. At indexing intervals of about 6 to 10 seconds, from 600 to 360 containers, in particular bottles, can be produced per hour.

FIGS. 3 and 4 show details of the conveyor chain on which the parisons are moved through the preheating station 28 from which they are taken in a particularly simple manner by the adapter means 26 on the carrier wheel 23. The conveyor chain 31 is made up of individual links 37 each having a central opening 38 to receive a parison P. The conveyor chain 31 is guided by a plurality of sprockets 39 so that it moves through the preheating station 28 in several turns. The arrangement and guidance of the conveyor chain 31 is illustrated in FIG. 3.

FIG. 4 is a sectional view of a link 37. Preferably, the link 37 is made of a temperature resistant plastic material and has a central opening 38 whose funnel-shaped walls 51 widen upwardly while their lower side is provided with an inwardly projecting annular flange 52. The parison P is shaped to have a bead W which rides on the flange 52. On either side of the link 37 flanges 53 and 54, respectively, are integrally formed which flanges are provided with bores 55 to receive pins (not shown) by which adjacent links are pivotally connected. As shown in FIG. 3, the conveyor chain is guided by a plurality of sprocket wheels 39, into which outwardly open recesses engage the links. In detail, the larger recesses 56 receive the midportion of the links 37, whereas the smaller recesses 57 receive the bolts for connecting the links. This provides for a sufficiently accurate guidance of the chain.

According to the indexing mode of operation of the carrier wheel 22, the conveyor chain 31 is also operating step-wise. To remove a parison, a link 37 of the chain is moved to lie with its opening 38 vertically below the discharge opening 36. To accomplish this the conveyor chain is driven by the drive means 24, 25 of the carrier wheel 22. That driving connection is not shown in detail. Preferably, the rotation of a sprocket wheel 39 is effected via suitable driving connections derived from the gearbox 24 with an additional clutch being provided which may be disengaged to stop the conveyor chain 31, while the carrier wheel 22 is being still rotated further.

The vertically depending position of the parisons P in the chain provides for the advantage that the hot air in the preheating station 28 can freely flow around the parisons, particularly heating the tubular portion of the parisons which are subjected to blow-molding. Furthermore, feeding and discharge of the parisons is facilitated, and only small feeding and discharge openings 30, 36 need to be provided.

As illustrated in FIG. 4, the forward end each of the adapter means 26 mounted on the arms of the carrier wheel 22 comprises a sleeve 85 having an annular exterior peripheral groove into which an annular seal 86 is inserted. In advancing the sleeve, it projects into the interior of the neck portion of the parison P and the annular seal 86 thus seals the gap between the inner wall of the neck portion and the sleeve. The provision of a seal is necessary to prevent the blowing air from escaping in the blowing station, and the seal fixes the parison to the arm for joint movement to the heating, blowing and removal stations.

FIG. 5 is a schematic view of the heating process of the parisons. Accordingly, the parisons are first heated in a preheating zone, which is resembled by the preheating station 28 to a highest possible preliminary level. Then the parisons are further heated to the required blowing temperature in the heating station 40 by means of infrared radiation. It was found that the temperature imparted to the parisons in the preheating zone should be as high as possible, and that the increase in temperature in the heating station 40 should be as small as possible. For controlling the wall thickness in the blowing step, it is desirable to gradually heat the parison in its axial direction in the heating station 40. Thus the parison is imparted a temperature profile $T_P$ in an axial direction, as shown by way of an example in FIG. 6, the temperature range required for blow-molding lying between the minimum temperature $T_{min}$ and the maximum temperature $T_{max}$, depending upon the plastics material used for the parison. Within these limits the temperature varies axially. In the example of FIG. 6, the parison is imparted an axial temperature profile between the lower temperature $T_2$ and the higher temperature $T_3$. In FIG. 6, the temperature profile $T_P$ is plotted over the length L of the parison P.

In FIG. 7, the rise in temperature during the heating time $t$ is plotted. The parisons enter the preheating station with an initial temperature $T_O$ and there they remain until the minimum temperature $T_1$ is positively reached. The minimum temperature $T_1$ must be reached from all possible initial temperatures, as indicated by the dotted curve paths. The minimum temperature $T_1$ of the parisons when leaving the preheating station should, as previously mentioned, be as high as possible so that subsequently, in the heating station 40, only the temperature profile between $T_2$ and $T_3$ need be imparted. This is advantageous in that a temperature drop across the walls of the parison from the exterior towards the interior is avoided owing to the uniform heating of the parison in the preheating zone. Further, the preheating zone ensures that the temperature T1 is positively reached irrespective of the height of the initial temperature $T_O$. Further, it is a particular advantage that the further heating in the heating station 40 takes place in a very short time without causing a substantial temperature drop across the walls of the parison. Furthermore, it is now possible to keep the hot-air stream in the preheating zone at a constant temperature level by means of a thermostat, and to also keep constant the electric power capacity of the infrared radiators in the heating station 40 so that the control means required hitherto for varying the heating capacity during the gradual heating of the parison can be dispensed with.

The gradual heating of the parison results from the variable speed at which the parison is advanced into the heating station 40. If the velocity is reduced, the temperature rises; if the velocity is increased, the portion of the parison within the range of the radiators is heated less. Thus, the advancing movement of the parison into the heating station is controlled by speed program and may depend either on time or distance. Preferably, a distance responsive control is employed because this provides for a direct correlation between the desired speed and the longitudinal dimensions of the parison. The speed may be controlled by a drive means with infinitely variable speed or by variety of fixed speeds which are set as the parison reaches predetermined marks as it travels through the heating station.

On the other hand, the minimum temperature T1 to which the parison is heated in the preheating station must be selected low enough so that in case of malfunction of the machine the parisons may remain in the preheating zone as long as desired without entailing disadvantageous effects. The temperature of the hot-air stream in the preheating station corresponds to the final temperature T1 of the parison when they are taken from the preheating station. This temperature of the hot-air stream is controlled by a thermostat. For PET (Polyethyleneterephthalate), a minimum temperature T1 of approximately 75° C is required, and the temperature range between $T_{min}$ and $T_{max}$ lies between about 90° C and 95° C. As shown in FIG. 6, the neck portion of the parison merges rather abruptly into the portion which is subjected to blowing. The temperature of the neck portion should be substantially below the temperature T min. This is achieved in that the neck portion is prevented from getting into the radiator area of the heating station while being retained by the adapter means which acts as a heat sink.

FIG. 8 is a sectional view of an arm 23 of the carrier wheel 23 and of the drive means for axially moving the parison on the arm by the adapter means. It should be noticed that the drive means is stationarily mounted to the wall 11 of the frame and that the adapter means 26 movably mounted on the arms 23 of the carrier wheel is adapted to be coupled to the drive in each rotational position of the carrier wheel.

The advantages thereof are that the carrier wheel can be of a simple structure, that the drive means need be provided only where required, that the drive means can be designed and controlled to satisfy particular requirements of motion. Moreover, the control of the drive is facilitated.

The drive means as illustrated in FIG. 8 serves to linearly move the adapter means 26 and is arranged adjacent the heating station 40; a substantially alike drive means is located adjacent the preheating station 28 for removal of the parisons. The latter drive means, however, lack a drive for rotation the adapter means and a speed control of the linear motion. No drive means are provided at the blow-mold station and the discharge station since there the adapter means 26 does not perform a linear motion.

A hub 60 is mounted on the shaft 21 rotatably driven by steps, to which hub a star wheel 61 is rigidly connected. Each arm 62 of the star wheel carries a radially movable pusher 63 which is displaceably guided in a guide member 64 secured to the forward end of the arm 62. The end of the pusher 63 facing the hub 60 is connected to a block 65 extending through a recess in the arm 62 and carrying at its rear side a follower member 67 in the form of a roller.

Rotating the carrier wheel 22 into the position above the discharge opening 36 of the preheating station and into the position in front of the heating station 40, the follower member 67 engages a groove 68 of a slide block 69 which is threaded on a spindle 70 stationarily secured to the wall 11. The spindle 70 at each end thereof is rotatably mounted by means of bearings 71 and 72 and is driven by a motor 73 via a toothed belt 74. When the motor 73 is energized after the carrier wheel 22 comes to a stop in the rotational position in front of the heating station 40, the spindle 70 starts rotating and displaces the slide block 69 with the follower member 67 being taken along and the pusher 63 performing a linear motion.

Switch means are mounted along the spindle 70 in the path of the slide block and actuated by the spindle nut 69 thereby the switches actuating suitable circuitries to vary the speed setting of the pusher drive 73. Through further switch means the length of stroke may be limited. Thus, the speed program to be performed by the parison for its motion into and out from the heating station 40 to achieve the desired temperature profile, is easily controlled.

As best shown in FIG. 13, the motor 73 will initially operate to drive the adapter means 26 and the parison P carried thereon toward the heater 40 at a first rate of speed. As the adapter moves from right to left as shown in FIG. 13, the elongated camming member 179 carried by the slide blocks 69 will contact the actuater of a first switching means 180. When the camming member 179 contacts the actuater of the switch 180, the normally opened contacts of switch 180 will close, causing a circuit to be completed between a source of potential and ground through the close contacts of switch 180 and a first potentiometer 185. The value of the potentiometer 185 may be selected to control the speed of the motor 73 as conventionally known. The output of the potentiometer 185 is fed to a summing junction 189 whose output is connected to a control amplifier 190. The outputs of the control amplifier 190 are fed through a switch 191 to control the speed of the motor 73. Since the motor 73 also drives a generator 192, a feed-back signal is supplied to the summing junction 189 which is proportional to the actual speed of the motor 73. The desired speed at which the motor 73 is to be operated, which is controlled by the setting of the potentiometer 185, is compared to the actual speed representative signal fed back from the generator 192 at the summing junction of 189 and an error signal proportional to the difference between the actual speed and the desired speed is fed to the control amplifier 190, which supplies a drive signal to the motor 73 to increase or decrease its speed to insure that the desired speed selected by the setting of the potentiometer 185 is maintained.

As the adapter means 26 is driven at this newly selected speed toward the heater 40, the elongated camming member 179 will engage the actuater of the second switching means 181. This will cause the normally opened contacts of switching means 181 to close and the normally closed contacts to open, thereby disconnecting switching means 180 and potentiometer 185 from the current path and inserting in its place, potentiometer 186 which may be used to establish a second different speed for the next linear segment of movement of the parison within the heater 40. Similarly, as the actuater of switching means 182 and 183 are engageably operated by the camming arm 179, still different speeds may be selected as determined by the setting on the potentiometers 187 and 188. Finally, the elongated camming arm 179 will cause the actuater of switching means 184 to close the normally opened contacts so as to complete a current path between the source of potential and the reversing switch 191. This causes the direction of current to the motor 73 to be reversed, thereby reversing the direction of the drive and causing the parison to be removed from the heating means 40 at a pre-determined constant speed, since all of the speed control switches 180-183 will have been rendered inoperative during the reverse drive operation.

It will be understood that the circuitry of FIG. 13 represents but one method of accomplishing the speed programming and limit control useful in achieving the desired temperature profile of the present invention. Any similar conventionally known control system, electrical or otherwise, could also be used.

Preferably, the parison P is rotated about its longitudinal axis during its linear motion in the heating station 40. To this end, the front end of the pusher 63 is provided with a flange 76 including a sleeve-like extension 77 which carries a bearing 76 rotatably supporting the adapter means 26. An extension member 80 secured to the slide block 69 carries a drive motor 81 for driving via gears 82 a pulley 83. This pulley 83 drives the adapter means 26 by frictional engagement obtained for example by a pair of magnetic wheels, while the parison P advances in the heating station 40, to provide for as uniform a heating of the parison as possible.

A sleeve 85 is secured to the forward end of the adapter means 26 which sleeve grips and seals the inner side of the neck portion of the parison P by means of an annular seal 86. The outer side of the neck portion is resiliently engaged by a collar 87.

The pusher 63 takes the shape of an air pressure cylinder whose piston rod 91 connected to the piston 90 extends through a bore in the flange 76 and the sleeve 85 of the adapter means 26. The forward end of the piston rod 91 defines an extensible mandrel 92 which is rendered operative only when the parison is positioned in the blow-mold station 42. The actuation of the mandrel 92 takes place by admitting air through a flexible conduit 93 connecting the air pressure cylinder of the pusher 63 to the hub 60. The hub 60 rotates on a stationary distribution plate 94 provided with air-pressure ports 95. In a specific rotational position of the carrier wheel 22, pressurized air can thus flow from port 95 into conduit 93 so as to extend the mandrel 92 in the blow-mold station 42. The blowing air is supplied from a pressure source through ports and grooves (not shown) in the distribution plate 94 and the hub 60 and through passageways (not shown) between the sleeve 85 and the mandrel 92 to the adapter means 26 and from there into the interior of the parison P in the well known manner.

The heating station 40 illustrated in FIGS. 8 and 9 comprises an annular casing 100 with a forward end flange 101 and a rearward end flange 102. In the annular space defined between the end flanges, a plurality of equidistantly peripherally disposed infrared radiators 103 is accommodated which are plugged in sockets 104 housing the electrical leads. The radiators are arranged in the focus of the metallic reflectors 105 of which configuration is shown in FIG. 9. The radiation of the infrared lamps is thus centered on the central axis of the heating station coinciding with the center axis of the parison P. The casing 100 comprises cooling passages 106 and coolant connections (not shown). The casing 100 is supported on a sleeve 107 secured to the frame 17 at 108.

FIGS. 10 and 11 view the blow-mold station 42 with the mold sections 43 and 44 in their open position as shown in FIG. 10, and in their closed position as shown in FIG. 11. Both mold sections are movably guided on bars 110 for moving between the open and closed position. Each bar 110 is secured to a support member 11 which in turn is secured to the wall 11 in a manner not shown.

Opening and closing of the mold section 43, 44 is achieved by a lever mechanism 45 which is disposed such that a free passage of the parisons into the mold and of the finished container out of the mold is ensured. The mold sections drive is located on the rear side of the mold section 44 and comprises a shaft 112 rotatably supported in the support member 111 and carrying on each end thereof a rigidly mounted plate 113. The shaft 112 is rotated via a toothed belt 114 by a motor 115. Eccentrically to the shaft 112, each of the plates 113 carries a diametrically opposite pin 116 and 117, respectively.

A rod 118 and 119 each rotatably extends through the center of the mold sections 43 and 44. The pins 116 on the plates 113 are connected to the ends of the adjacent rod 118 by short levers 120, and the pins 117 are connected to the ends of the remote rod 119 by long levers 121. Both short and long levers 120, 121 are provided with suitable bores to receive the pins and rods. To compensate inaccuracies in mounting, adjustable eccentric rings can be inserted in the bores of the long levers 121 receiving the rod 119. Thus, the distance between the center of the pin 117 and the rod 119 can be precisely adjusted by turning the eccentric rings.

FIG. 2 shows the blow-mold station 41 in the closed position where the drive shaft 112 has been rotated such that the centers of pins 116, shaft 112, pins 117, and rods 118 and 119 are in free alignment with respect to each other. Thus, the blow pressures to which the mold sections are subjected during blowing and which are very high act against each other in the plates 113 towards the shaft 112. This provides for a complete compensation of forces and the mold sections can be easily maintained in the closed position.

To open the mold sections, the drive shaft 112 is rotated whereby the plates 113 carrying the pins 116, 117 are moved to a position as shown in FIG. 10. In this position, the mold sections 43, 44 are separated and owing to the unique configurations of the long levers 121 which is shown in FIG. 10, it is possible for the finished container to emerge between the mold sections 43 and 44 and below the edge 122 of the yoke-like lever 121. Moreover, due to the rotation of the plate 113 the pin 117 and thus the corresponding end of the lever 121 are somewhat lifted to increase the free passage height between the mold sections.

As soon as a parison P has been moved between the mold sections by a proper rotation of the carrier wheel 22, the bottom mold section 125 is lowered by an air pressure drive means 126 to a predetermined position, whereupon the mold sections 43, 44 are closed. As before said, no drive means for actuating the pusher 63 and the adapter means 26 is provided at the blow-molding station. Rather, the follower member 67 of the pusher can engage a stationary guiding groove and is thus retained in fixed position. The expanding mandrel 92 is extended upon actuation of the piston 90 by pressurized air and expands the parison P to a length defined by the bottom mold 125. At the same time blowing air is injected into the parison which is inflated until its walls contact the molding surface of the mold sections. After releasing the blowing air the mold sections are opened and the finished container P is moved to the discharge station in a further 90° rotation of the carrier wheel.

It should be understood that the drive mechanism for moving the mold sections is arranged just on one side of the blow-molding station thus allowing for free access on the opposite side. The actuation via the levers 120 and 121 is relatively simple. In the closed position of the mold sections, the forces resulting from the blowing pressure are easily balanced, whereas in the open position of the mold sections the free passage of the parisons and the containers is ensured due to the arcuate configuration of the levers 121.

FIG. 12 is a sectional view of the mold sections 43 and 44. As shown, each mold section is provided with an insert 130 and 131, respectively. The inner surfaces 132 and 133 of the inserts define the bottle forming walls. The outer surfaces 134 and 135 of the inserts are of semi-cylindrical shape and fit into corresponding semi-cylindrical recesses 136 and 137, respectively, of the mold sections 43 and 44. The inserts 130 and 131 are centered with respect to the mold sections by chamfered shoulders 138 and 139, respectively. The inserts are held in place by mounting flange members 140 and 141, respectively, which engage corresponding semi-cylindrical recesses 142 and 143, provided in the inserts and which are secured to the mold sections 43 and 44 by suitable screw means. The mounting flange members 140 and 141 enclose a cylindrical cavity to receive the adapter means 26.

After detaching the mounting flange members 140 and 141 the inserts 130 and 131 can be easily removed downwardly in the open position of the mold sections. Thus, it is easy to replace the inserts if, for example, a different bottle shape is desired.

The semi-cylindrical inner surfaces 136 and 137 of the mold sections 43, 44 are provided with grooves 144 and 145 which are open towards the inserts and are arranged in uniform distances. The grooves 144, 145 extend peripherally and terminate in a distance from the longitudinal edge of each mold section. In the wall between the end of each groove and the longitudinal edge as well as in the wall above the uppermost and below the lowermost groove a continuous groove-like recess is provided which receives a seal 148 and 149, respectively. Both the grooves 144, 145 and the seals 148 and 149 are shown in FIGS. 11 and 12. All grooves 144, 145 are thus disposed within the wall surface enclosed by the continuous seals 148 and 149 which extend close along the edges of the semi-cylindrical surfaces of the mold sections. Thereby the coolant is confined to flow in the grooves and cools effectively the outer surfaces 134 and 135, respectively, of the inserts.

Both ends of each individual groove 144 and 145 communicate through a port 150 with a passage 151. Between each pair of ports 150 opening into the passage 151 a screw 152 extends into the coolant flow which screw is adjustable from outside to control the coolant flow through the passage 151. By adjusting the screws 152, it is possible to permit the coolant to meander through the grooves whereby the coolant flows in opposite direction in adjacent grooves and is reversed at the end of each groove in the passage 151. The supply and release of coolant to and from the passage 151 in each section is achieved via supply passages 153 which are provided with suitable supply connections 154.

The cooling system provides for the advantage that the inserts 130, 131 can be easily replaced without the need to exchange the cooling system or the supply connections. Nevertheless, the inserts are intensively cooled due to the grooves in the mold sections facing against the outer surfaces of the inserts.

What is claimed is:

1. A machine for blow molding articles from blowable parisons, comprising a rotatable shaft, means for rotating said shaft in stepwise fashion, a plurality of work stations located concentrically about said shaft at which various heating and blowing operations are carried out, at least one of said stations being positioned further from the shaft than others of said stations, a plurality of radial arms carried by said shaft for rotation therewith, each such arm comprising telescopic inner and outer sections movable relative to one another to vary the radial length of the arm, the inner of said sections being secured to the shaft and the outer of said sections carrying at its outer end an adapter for retaining a parison, fixed actuating means located adjacent said at least one station, said actuating means engaging only the outer section of that arm positioned at said at least one station, and means for actuating said actuating means to telescopically extend said arm sufficiently to position said adapter at said at least one station.

2. A machine as defined in claim 1, wherein said at least one station is a pre-heating station at which parisons are suspended, and the arm is extending at the pre-heating station to engage a pre-heated parison.

3. A machine as defined in claim 1, wherein said at least one station is a heating station into which a parison retained on said adapter is inserted for heating.

4. A machine as defined in claim 1, wherein said at least one station is a pair of adjacent successive heating stations and adjacent, separate fixed actuating means are provided for extending adjacent arms at said stations, respectively.

5. A machine as defined in claim 1, wherein the actuating means is a rotatable, driven screw having a non-rotatable nut threaded thereon, and cooperable coupling means on the nut and on the outer section of each arm, said coupling means interconnecting the actuating means and the arm outer section when said arm is positioned at said at least one station.

6. A machine as defined in claim 1, wherein the rotatable shaft is horizontal, the radial arms lie in a common vertical plane, and actuating means for extending the radial arms are provided at two stations.

7. A machine as defined in claim 3, wherein said actuating means also includes means for rotating the adapter and the parison retained thereon during heating at said station.

* * * * *